United States Patent

Cheprasov et al.

[11] Patent Number: 6,045,431
[45] Date of Patent: Apr. 4, 2000

[54] MANUFACTURE OF THIN-FILM MAGNETIC HEADS

[75] Inventors: Sergei Cheprasov, Niles, Ill.; Gordon J. Grosslight, Westcliffe, Colo.

[73] Assignee: Speedfam Corporation, Chandler, Ariz.

[21] Appl. No.: 08/996,935

[22] Filed: Dec. 23, 1997

[51] Int. Cl.[7] ............................................... B24B 49/10
[52] U.S. Cl. ........................................................... 451/5
[58] Field of Search .................................. 451/5, 11, 405, 451/55, 387, 12, 41; 29/603.16

[56] References Cited

U.S. PATENT DOCUMENTS

| | | |
|---|---|---|
| Re. 35,477 | 3/1997 | Hussinger et al. . |
| 4,062,659 | 12/1977 | Feierabend et al. . |
| 4,457,114 | 7/1984 | Hennenfent et al. . |
| 4,517,041 | 5/1985 | Hennefent et al. . |
| 4,524,547 | 6/1985 | Heaston et al. . |
| 4,605,977 | 8/1986 | Matthews . |
| 4,666,315 | 5/1987 | Scranton . |
| 4,689,877 | 9/1987 | Church . |
| 4,882,078 | 11/1989 | Nishimura et al. . |
| 4,912,883 | 4/1990 | Chang et al. . |
| 4,914,868 | 4/1990 | Church et al. . |
| 5,023,991 | 6/1991 | Smith . |
| 5,031,055 | 7/1991 | Yanagisawa . |
| 5,054,266 | 10/1991 | Takamatsu et al. . |
| 5,065,483 | 11/1991 | Zammit . |
| 5,117,589 | 6/1992 | Bischoff et al. . |
| 5,171,484 | 12/1992 | Nishimura et al. . |
| 5,175,938 | 1/1993 | Smith . |
| 5,191,708 | 3/1993 | Kasukabe et al. . |
| 5,203,119 | 4/1993 | Cole . |
| 5,214,589 | 5/1993 | Tang . |
| 5,230,184 | 7/1993 | Bukhman . |
| 5,276,573 | 1/1994 | Harada et al. . |
| 5,361,547 | 11/1994 | Church et al. . |
| 5,365,700 | 11/1994 | Sawada et al. . |
| 5,378,382 | 1/1995 | Nishimura et al. . |
| 5,386,666 | 2/1995 | Cole . |
| 5,406,694 | 4/1995 | Ruiz . |
| 5,463,805 | 11/1995 | Mowry et al. . |
| 5,468,177 | 11/1995 | Kindler et al. . |
| 5,494,473 | 2/1996 | Dupuis et al. . |
| 5,495,279 | 2/1996 | Sandstrom . |
| 5,506,829 | 4/1996 | Yagi et al. . |
| 5,525,091 | 6/1996 | Lam et al. . |
| 5,531,017 | 7/1996 | Church et al. . |
| 5,554,939 | 9/1996 | Hirae et al. . |
| 5,567,199 | 10/1996 | Huber et al. . |
| 5,568,252 | 10/1996 | Kusuda et al. . |
| 5,597,340 | 1/1997 | Church et al. . |
| 5,603,156 | 2/1997 | Biskeborn et al. . |
| 5,607,340 | 3/1997 | Lackey et al. . |
| 5,619,235 | 4/1997 | Suzuki . |
| 5,620,356 | 4/1997 | Lackey et al. . |
| 5,624,298 | 4/1997 | Yumoto . |
| 5,632,669 | 5/1997 | Azarian et al. . |
| 5,876,264 | 3/1999 | Church et al. ............................... 451/5 |

FOREIGN PATENT DOCUMENTS

| | | |
|---|---|---|
| 0 504 887 A2 | 9/1992 | European Pat. Off. . |
| 58-120468 | 12/1981 | Japan . |
| 59-148113 | 8/1984 | Japan . |
| 4-53672 | 2/1992 | Japan . |
| 4-146070 | 5/1992 | Japan . |

*Primary Examiner*—David A. Scherbel
*Assistant Examiner*—George Nguyen
*Attorney, Agent, or Firm*—Fitch, Even, Tabin & Flannery

[57] ABSTRACT

Improved manufacture of thin-film magnetic heads includes a piezoelectric driven actuator for bending row tools used in the mass manufacture of magnetic heads. The actuator is independent of the row tool and includes a lever arm which structurally deflects when driven by the piezoelectric element, converting physical displacement of the piezoelectric element to a force supplied to the row tool, through a portion of the lever arm arranged to undergo deflection. Arrays of piezoelectric actuators are also disclosed for individual adjustment of each magnetic head component of a row being polished.

29 Claims, 6 Drawing Sheets

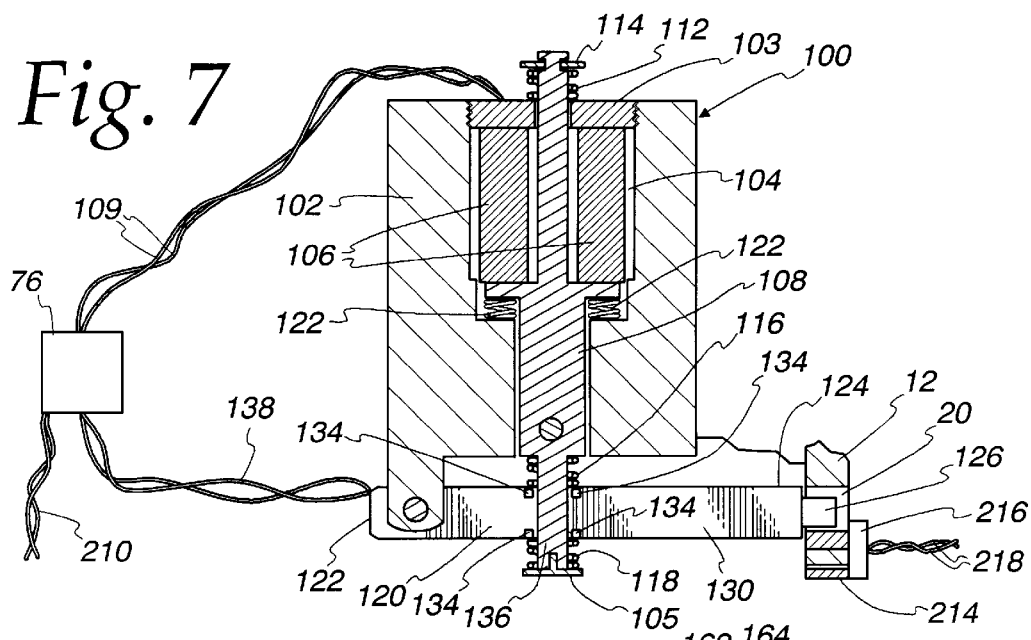

MANUFACTURE OF THIN-FILM MAGNETIC HEADS

BACKGROUND OF THE INVENTION

1. Field of the Invention

The present invention pertains to the polishing of thin-film magnetic heads, and in particular to polishing conducted in a batch mode.

2. Description of the Related Art

Digital data processing equipment, such as hard disk drives used with computer systems, is being produced in increasing numbers and a continuing effort is being made to improve device speeds while reducing manufacturing costs. An important component of such devices is the head stack assembly or slider assembly which includes one or more magnetic heads for storing and accessing data contained on a magnetic storage disk. Although magnetic heads can be manufactured singly, it has been found more efficient to produce such heads in a batch process.

In one type of production of magnetic heads, multiple magnetic heads are arranged side-by-side to form an array typically referred to as a "row". The magnetic heads, grouped together in a row form, are mounted in mass on a row tool or bar to facilitate lapping or polishing of the individual magnetic heads disposed in the row. After lapping or polishing, the individual magnetic heads are separated from the row.

Several types of magnetic heads have been developed over the years. In the recent past, thin-film inductive heads were the most popular type of magnetic heads in commercial use. However, the commercial usefulness of such heads began to wane as the market demanded magnetic storage devices of higher magnetic densities and higher device speeds. Both of these trends tended to diminish the data storage signals which could be developed in thin-film inductive heads and commercial market interest switched to thin-film heads of the magnetoresistive (MR) type. A significant technical advantage of MR magnetic heads is their ability to develop greater signal strength, independent of storage disk velocity.

As with previous thin-film devices, the MR magnetic heads are developed by depositing a number of layers on a substrate. The deposited layers form a magnetoresistive stripe located adjacent the pole tips of the head. In operation, the magnetoresistive stripe of material is made to conduct a steady sense current which sees a changing resistance in the stripe as the stripe passes through varying magnetic fields of the memory storage disk. Typically, MR heads include separate read and write elements and alignment of these elements, especially under ongoing pressures to miniaturize magnetic head devices, is of special importance. In particular, one device parameter, the so-called "stripe height" has been subjected to increasingly tightened dimensional tolerances. Essentially, the stripe height is the distance between the air bearing surface of the magnetic head which rides over the storage disk (i.e., the portion adjacent the pole tips) and the region where the magnetoresistive stripe is formed. The stripe height is defined by accurate lapping of the pole tips and adjacent end portions of the MR heads. Typical stripe heights are on the order of one micrometer and it is desired to attain a predetermined stripe height within an accuracy of one micro inch (approximately the 40th part of a micrometer). As will be appreciated, the lapping process must be carried out with considerable precision.

As mentioned above, for commercial production reasons, the pole tips defining the transducing gap of each MR head in a row formation are simultaneously lapped such that, when the lapping procedure is completed, all the heads of the row formation have the desired stripe height. Typically, the row tool on which the heads are mounted is manipulated so as to advantageously deform the row structure to apply differential lapping rates to different heads in the row formation. Such manipulation is required for a number of reasons. For example, the amount of material between the desired stripe height and the free edge of the row varies, due to manufacturing tolerances, and, oftentimes some of the heads in the row formation require greater amounts of material which must be removed in order to attain the desired stripe height.

Manipulation of the row tool is also required because the row tool is subjected to stress inducing processes which result in the tool assuming an undesirable curvature which must be corrected during the polishing operation. The need to advantageously manipulate the row tool has given rise to several mechanical solutions as can be observed in U.S. Pat. Nos. 5,203,119 and 5,117,589, for example.

One arrangement is disclosed in U.S. Pat. No. 5,607,340 which provides row tool having elongated relief slots advantageously positioned so as to provide an improved shape conformance ability. The row tool is manipulated by three bend rods which impart a mechanical force to the row tool, causing the bottom of the row tool to take on different shapes, as desired. Typically, the row tool is continuously manipulated throughout a polishing operation to alter the lapping rates of individual head members of the row of an ongoing, dynamic adjustment basis throughout the lapping procedure.

U.S. Pat. No. 5,620,356 provides correction apparatus for row tool balance and bow, using electromechanical deices to apply bending loads to the row tool. The electromechanical devices operate with automatic open-loop control, using signals obtained from the products being processed by the row tool. Open loop control system requires sophisticated calibration equipment that is difficult to use and maintain so as to avoid introduction of subtle errors. The electromechanical deices undergo a travel which is largely nonlinear with only a very narrow area of operation where the force output is substantially linear. Accordingly, the assembly and operation of the electromechanical devices must be carried out in a costly, time-consuming manner to ensure that the relatively small desirable area of operation is effectively employed. Despite these precautions, such systems are subject to downstream mechanical hysterisis which will adversely affect operating precision. Improvements to overcome these and other drawbacks encountered in the manufacture of sliders, slider assemblies, head stack assemblies, as well as the individual magnetic heads is continually being sought.

SUMMARY OF THE INVENTION

It is an object of the present invention to provide a tool for lapping a plurality of workpieces, such as magnetic heads, on a batch basis.

Another object of the present invention is to provide a row tool for mounting a plurality of magnetic heads or similar devices arranged in a linear array or row.

A further object of the present invention is to provide a row tool of the above-described type which offers increased shape compliance, especially one in which the lapping force applied to a particular member of the row formation may be adjusted with minimal collateral effect on the force supplied to neighboring members of the row formation.

Another object of the present invention is to provide a row mounting assembly for mounting a row of magnetic heads or similar devices, and for manipulating the curvature of the row on an ongoing basis, during a grinding, lapping, polishing or similar surfacing operation in which the members of the row formation are simultaneously processed.

These and other objects of the present invention which will become apparent from studying the appended description and drawing are provided in a row tool assembly, comprising:

an elongated mounting bar having a bottom portion between opposed ends;

a plurality of teeth spaced apart by bend openings formed in the bottom portion of the mounting bar;

a plurality of spaced-apart workpieces joined side-by-side to form a linear row having opposed upper and lower row surfaces, with the upper row surface joined to the bottom edge of said bar member with individual workpieces aligned with individual ones of said plurality of teeth, a plurality of stress relief openings formed between said plurality of workpieces so as to free said workpieces for individual, substantially independent movement; and said bend openings aligned with said workpieces and said stress relief openings aligned with said teeth and extending between 70 and 95% of the distance between the upper and the lower row surfaces.

Other objects of the present invention are attained in a row tool actuator for applying an aligning force to a row tool during a surfacing operation, comprising:

an actuator body;

a lever having a bendable central portion between a first end and a second opposed end for engaging a row tool, portions of the lever remote from the second end pivotally connected to the actuator body for supporting cantilever loadings applied to said lever;

a plunger mounted by said actuator body for movement toward and away from said lever; and a piezoelectric element and counteracting bias springs mounted by said actuator body to urge the plunger toward and away from said lever so as to apply an adjusting force to the central portion of said lever, thereby causing a desired force to be applied to said row tool by the second end of said lever.

Further objects of the present invention are attained in a method of preparing an array of magnetic heads joined side-by-side to form a linear row having a bottom free edge, comprising the steps of:

providing a mounting bar having a bottom edge carrying a plurality of spaced-apart teeth;

mounting the array of heads to said mounting bar, with individual ones of said magnetic heads located adjacent respective ones of said plurality of teeth;

providing a rough polish wheel;

pressing said mounting bar toward said rough polish wheel so as to press said magnetic heads in polishing engagement with said rough polish wheel;

forming slots between said magnetic heads in said row of magnetic heads extending more than half of the distance from the bottom free edge of said row of magnetic heads and the bottom edge of the mounting bar;

providing a fine polish wheel; and pressing said mounting bar toward said fine polish wheel so as to bring said plurality of mounting heads into polish engagement with said fine polish wheel.

BRIEF DESCRIPTION OF THE DRAWINGS

FIG. 7 is a fragmentary front elevational view of a row tool assembly according to the principles of the present invention;

FIG. 8 is a view similar to that of FIG. 7 shown after a polishing operation;

FIG. 9 is a cross-sectional view similar to that of FIG. 3 but showing an alternative construction;

DETAILED DESCRIPTION OF THE PREFERRED EMBODIMENT

Figure 14:
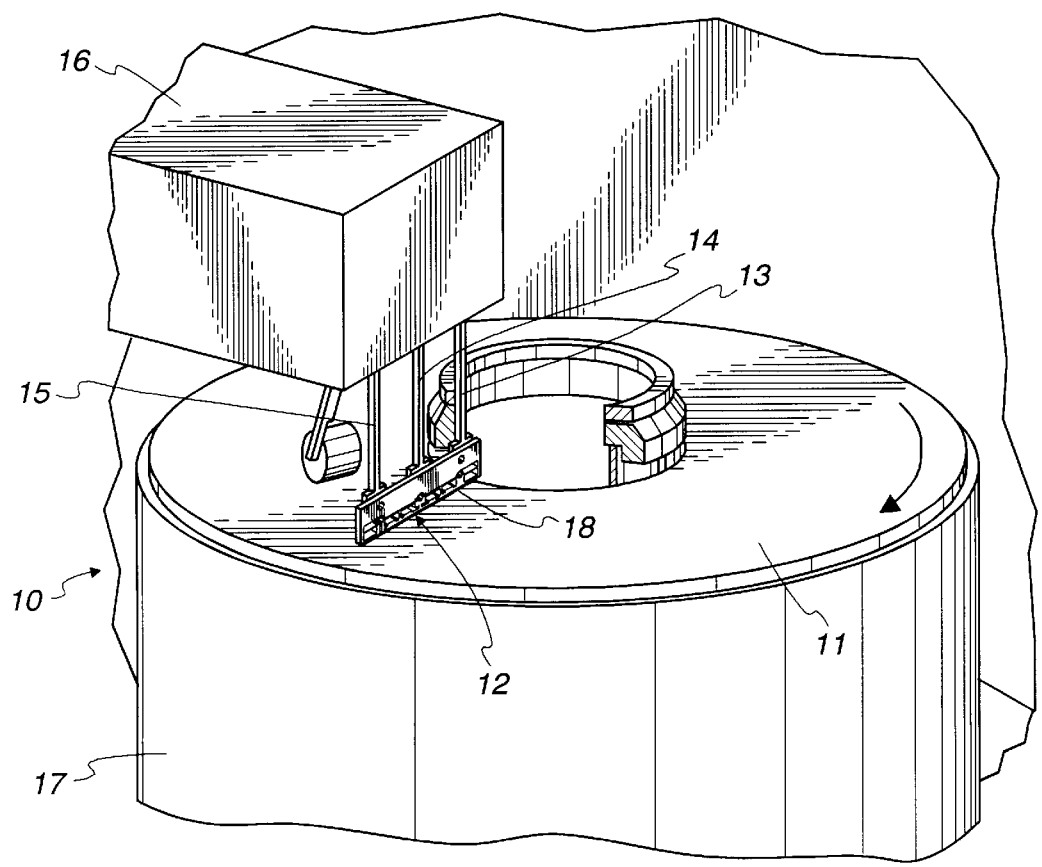
FIG. 14 shows a prior art row polishing arrangement.

Referring now to the drawings, and initially to FIG. 14, a prior art surfacing system is generally indicated at 10 and includes a lapping machine 17 having an upwardly facing lapping wheel 11. The lapping machine 17 and lapping wheel 11 are of conventional construction and preferably are of a type using a free abrasive material carried on the lapping wheel to perform a grinding, lapping polishing or other surfacing operation on workpieces placed in contact with the lapping wheel.

Figure 6:
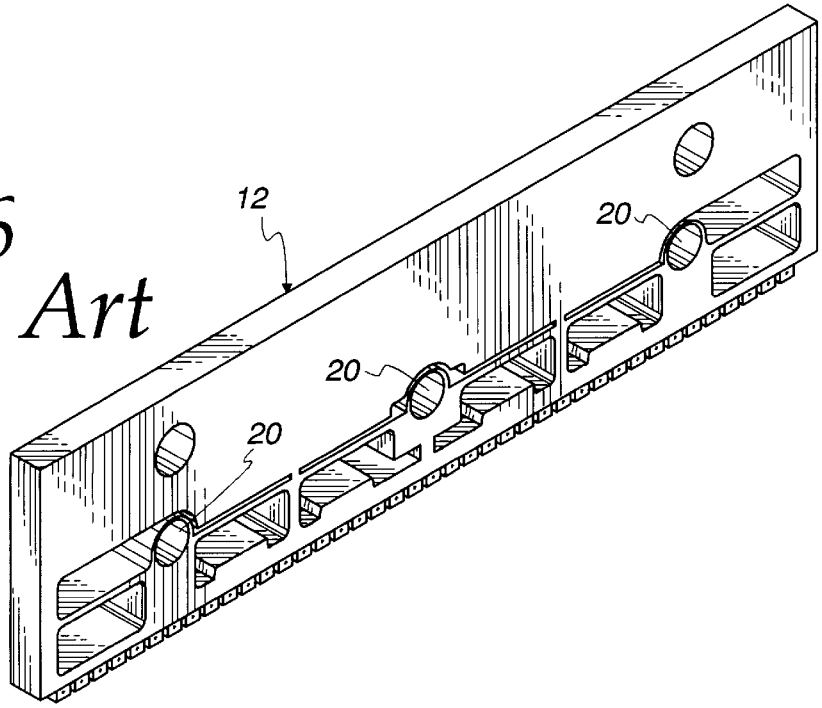
FIG. 6 is a perspective view of the row tool used therewith.

A plurality of workpieces, such as magnetoresistive heads (not visible in FIG. 14), are mounted on the bottom edge 18 of a row tool generally indicated at 12. Row tool 12 is suspended at the lower end of an array of support struts 13, 14, 15. Bend rods (not visible in FIG. 14) are carried at the bottom ends of support struts 13, 14, 15 and extend through holes 20 in the row tool (see FIG. 6). The support struts 13, 14, 15 extend downwardly from an actuator assembly 16 which applies a force to the support struts so as to deform the row tool in a desired manner.

Figure 1:
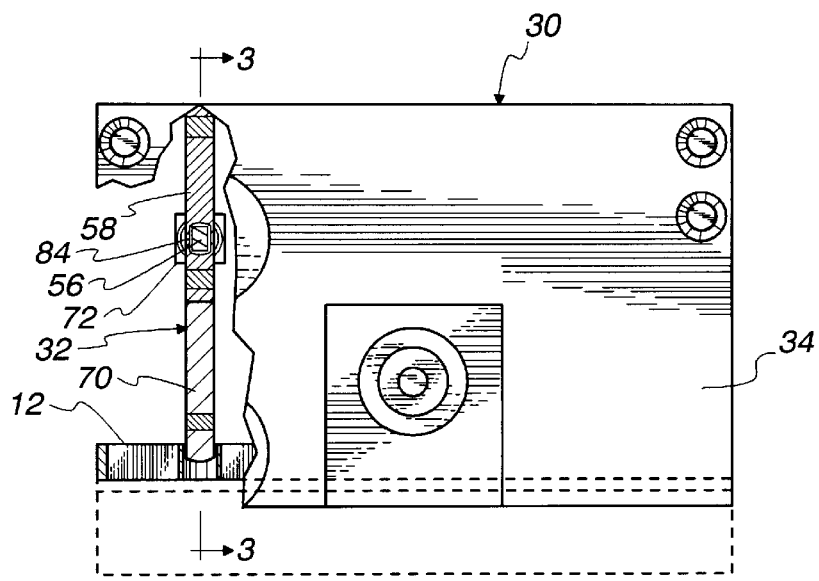
FIG. 1 is a top plan view of polishing apparatus according to principles of the present invention.
Figure 2:
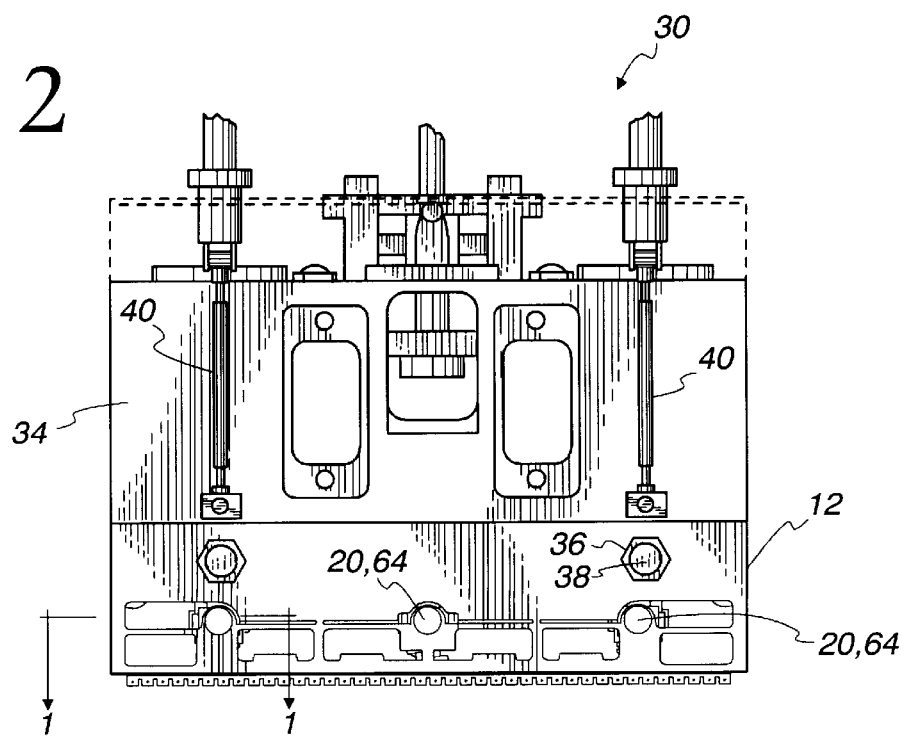
FIG. 2 is a front elevational view thereof.
Figure 3:
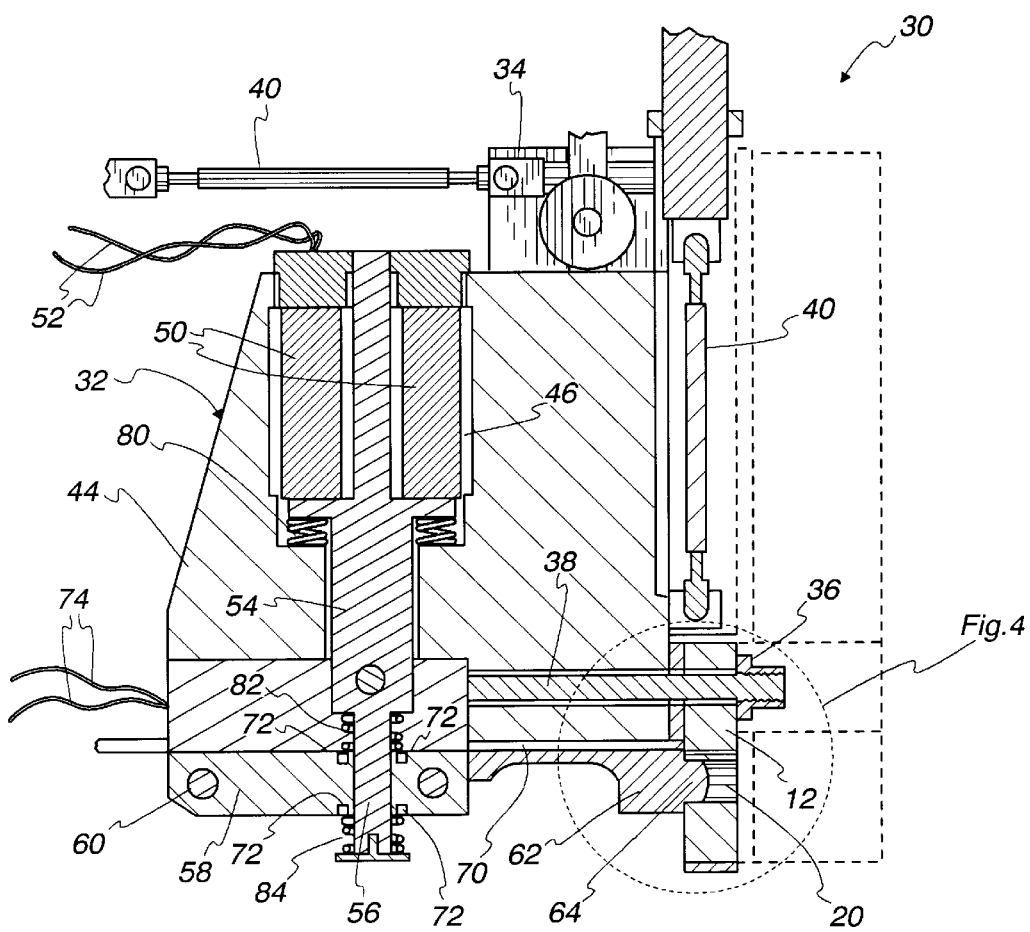
FIG. 3 is a cross-sectional view taken along the line 3—3 of FIG. 1.
Figure 4:
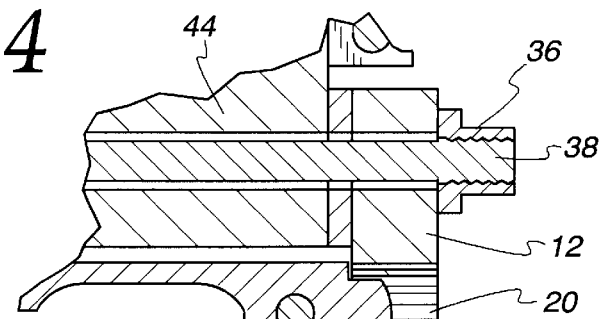
FIG. 4 is an exploded fragmentary view of FIG. 3.
Figure 5:
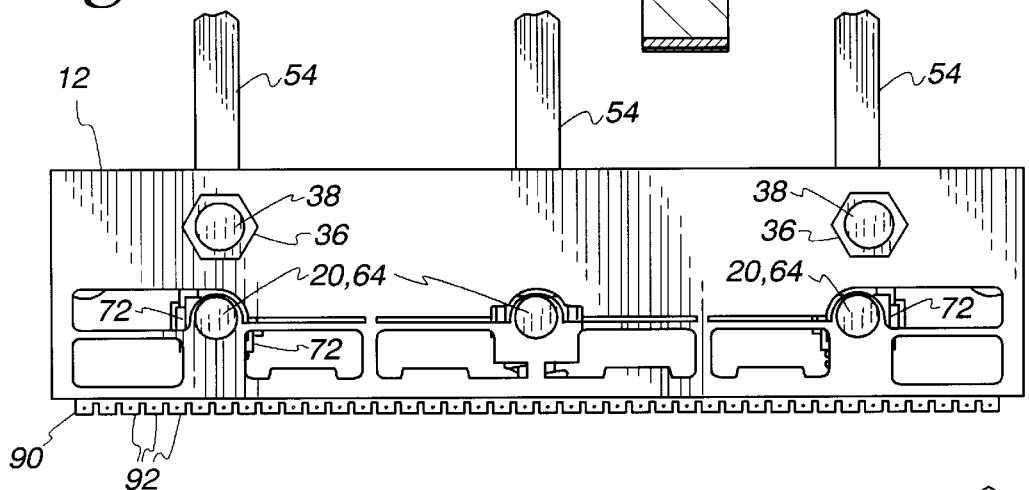
FIG. 5 is an enlarged view of the bottom portion of FIG. 2.

Referring now to FIGS. 1–5, an actuator arrangement according to the principles of the present invention is generally indicated at 30. Actuator arrangement 30 includes a plurality of actuators 32 (see FIG. 3) carried by a mounting structure 34. As can be seen, for example, in FIG. 2, row tool 12 is mounted at the bottom of actuator 34, being secured with nut fasteners 35 to threaded studs 38. Accordingly, row tool 12 and preferably the upper portion thereof is rigidly secured for ultimate support by mounting structure 34. As can be seen in FIG. 3, in the preferred embodiment, threaded studs 38 extend from actuator 32 to provide the rigid securement. As will be noted herein, the present invention has found immediate commercial acceptance in the field of mass polishing of magnetic heads and in particular to thin-film heads of the magnetoresistive (MR) type, where it is customary to crown the air bearing (bottom) surfaces of the heads, adjacent the heads' pole tips. A number of extendable arms 40, visible in FIGS. 2 and 3, form part of a system for pivoting the workpieces along several different axes during polishing so as to perform a crowning operation on the bottom surface of the workpieces.

Actuator 32 includes a body 44 defining a cavity 46 for receiving a piezoelectric element 50 of conventional construction, energized by appropriate signals applied to electrical conductors 52. The piezoelectric element 50 bears against a plunger 54 which is mounted for vertical reciprocal movement. The lower end 56 of plunger 54 engages a lever arm 58 which is pivotally connected at 60 to actuator body 32. Lever arm 58 has a second end 62 carrying a bend pin 64 inserted in hole 20 formed in row tool 12.

Referring again to FIG. 3, lever 58 further includes a central bendable portion 70 intermediate the ends of the lever. Multiple (preferably four) conventional load cells 72 are coupled through electrical conductors 74 to external control circuitry 76, providing electrical signals indicating the deflection of bendable portion 70. Three sets of springs 80, 82 and 84 bias plunger 54 to a centered, no-load position. The piezoelectric element 50 drives plunger 54 in opposing directions so as to impart upwardly and downwardly directed forces to bend pin 64, which in turn imparts the aligning force to row tool 12.

The lower free end of plunger 54 has an enlarged head which holds bias spring 84 captive against the lower edge of lever arm 58. Further, plunger 54 includes a shoulder portion which holds bias spring 82 captive against the upper end of lever arm 58, while bias spring 80 is located in cavity 46 to impart an upward bias force at the upper end of plunger 54.

As will be appreciated from reviewing FIGS. 1–3, the piezoelectric element is independent of the row tool for ready servicing, and to allow the row tool an economy of manufacture which permits its disposal upon successful completion of a polishing operation. Further, the force developed by the piezoelectric element causes structural deflection of the lever arm, so as to efficiently convert physical displacement of the lever arm to a readily measurable force applied through deflection of the upper arm to the row tool. It will be noted that this deflection takes place "downstream" of hysterisis elements employed in the actuator assembly, such as pivot connection 60 and the various bias springs employed. Deflection of lever arm 58 can be readily measured using economical conventional load cells, and effective, inexpensive controls can be employed to apply an accurate and reliable force to the row tool throughout multiple cycles of operation of the piezoelectric-driven actuator components.

Referring now to FIG. 7, an alternative embodiment of an actuator is generally indicated at 100. Actuator 100 includes a body 102 defining a cavity 104 for receiving piezoelectric element 106, energized by signals in electrical conductors 109. A plunger 108 is biased by four sets of springs, including a return spring 112 (held captive by a keeper ring 114 at the upper end of the plunger), bias springs 116, 118 (to apply force to the upper and lower edges of a lever arm 120) and springs 122, located in cavity 104 (to apply a pre-load force to plunger 108).

Lever arm 120 is pivotally connected at a first end 122 to actuator body 102 while the opposite end 124 carries a bend pin 126 received in aperture 20 of row tool 12. Lever arm 120 includes a central bendable portion 130, an intermediate end 122 pinned for cantilever support, and a second free end 124 carrying the bend pin 126 which engages the row tool. If desired, bendable portion 130 in FIG. 7 can be formed by relieving the lever arm with appropriately configured apertures.

Plunger 108 applies upward and downward force to lever arm 120 at a point immediately adjacent the central bendable portion 130. The force is preferably applied to lever arm 120 through bias springs 116, 118. As in the preceding embodiment, it is preferred that load cells be employed to measure the deflection of lever arm 120 and, indirectly, the upward and downward force applied by bend pin 126 to row tool 12. In the preferred embodiment, four load cells 134 are employed, and are arranged on either side of the lower end 136 of plunger 108. The load cells 134 are coupled through electrical connecters 138 to conventional electronic circuitry for monitoring load cell readings on an ongoing, real time basis. If desired, the four load cells 134 could be combined into a single compression/tension load cell which measures the force applied to lever arm 120 by plunger 108.

When appropriate electrical signals are applied to electrical conductor 109 by conventional control circuitry 76, piezoelectric element 106 is energized so as to apply a downward force to plunger 108, causing lever arm 120 to pivot about its second end 122. Bend pin 126 contacts the bottom edge of aperture 120 formed in row tool 12 so as to apply a local downward force to the row tool. As force is thus applied to the row tool, the central bendable portion 130 of lever arm 120 is deflected in a downward direction, proportional to the applied force, as measured by load cells 134.

The bottom end of piezoelectric element 106 is bonded to plunger 108 so as to pull plunger 108 in an upward direction as signals in conductor 109 cause the piezoelectric element to contract. With expansion and contraction of the piezoelectric element, energy is transferred through spring 116 (for piezoelectric element expansion) and spring 118 (for piezoelectric element contraction), transmitting the actuator force through the adjacent load cells 134 to lever arm 120. Preferably, lever arm 120 is balanced to a neutral position by combination of forces of the bias springs 112, 116, 118 and 122. As the piezoelectric actuator continues to expand or contract from its mid-stroke position, the upper or lower springs 116, 118 are further compressed, resulting in an increasing differential force developed between the two springs. This force is transmitted through the load cells to the bend pin, and hence to the row tool. As will be appreciated, the resultant force, which causes the desired deflection in the row tool, can be precisely controlled. If desired, the load cells 134 of actuator 100 can be relocated to the bendable portion 130.

Referring again to FIG. 7, actuator body 102 includes a threaded cap 103 enclosing the upper end of aperture 104. With removal of the enlarged head 105 at the bottom end of plunger 108 and with the removal of threaded cap 103, the piezoelectric element 106 and bias springs 112, 122 and 116 and 118 can be easily removed for servicing. Further, actuator 100 can be adapted to multiple force ranges by changing the spring constants of one or more of the bias springs employed. If further adjustment of the force range is required, the location of the pivot point on the lever arm, and the distance between pivot point and plunger can be varied.

Referring now to FIG. 8, an alternative actuator is generally indicated at 150. Actuator 150 includes an actuator body 152 defining an aperture 154 for piezoelectric element 156. The upper end of plunger 158 and pre-load springs 160 are received in aperture 154. The upper end of plunger 158 includes a keeper 162 and a bias spring 164. The lower end 168 of plunger 158 includes a shoulder portion 170 and an enlarged free end 172. Bias springs 174, 176 engage the top and bottom edges of lever arm 178, adjacent its first end 180. Lever arm 178 is pivotally connected at 184 to actuator body 152. An intermediate bendable portion 188 is located between the pivot connection 184 and a second free end 190 of lever arm 178, which carries a bend pin 192 receivable in aperture 20 formed in row tool 12. Multiple (preferably four) load cells 194 are located in bendable portion 188 so as to provide a direct measurement of its deflection, and, indirectly, the amount of force and direction of force, applied to row tool 12.

The bias springs 160, 164, 174 and 176 cooperate with the piezoelectric element 156 to maintain bend pin 192 in a neutral position until an aligning force for the row tool 12 is required. With appropriate signals applied by electrical conductors 198 to piezoelectric element 156, force is applied to the first end 180 of lever arm 178 producing the desired force at bend pin 192 with associated deflection in bendable portion 188.

Referring again to FIG. 8, as with the preceding embodiment illustrated in FIG. 7, actuator 150 can be readily adapted to different force ranges by changing the bias springs employed. For example, by removing keeper 162 in spring 164, screw cap 196 can be removed, exposing cavity 154 and allowing removal of piezoelectric element 156. Thereafter, enlarged head 172 can be removed from the lower end of plunger 158, allowing the plunger to be withdrawn from the actuator body, thus freeing the bias springs 160, 174 and 176.

With the above-described actuator systems, forces applied to the row tool can be rapidly changed in magnitude and direction, while at the same time, the force applied to the row tool can be accurately and reliably read in either direction of actuation. Further, when multiple load cells are employed, self-calibration routines can be carried out among the load cells without requiring interaction with the product carried on the row tool, and such calibration can be performed dynamically during a polishing operation, as well as statically.

With the present invention, an electrically actuated feedback control system of the open-loop or, more preferably, closed-loop type can be developed in a simple and economical manner using readily available conventional control components. For example, reference to FIG. 7, electrical conductors 210 are coupled to control circuitry 76 to provide input signals for the control circuitry responsive to signals obtained from elements of the row. U.S. Pat. No. 5,620,356 provides electrical connection with magnetic heads in an open-loop control system, while U.S. Pat. No. 4,914,868 provides electrical connection to indicator elements in a closed-loop control system. In either type of control system, electrical signals passed through the indicator elements provide a real-time indication of the current stripe height at a given instant during a row polishing operation. For example, a row of magnetic heads 214 is mounted to the bottom edge of row tool 12, all shown in FIG. 7.

A conventional electrical connector device 216 contacts the electronic components carried as elements of the row. As mentioned, these electronic elements can comprise either the magnetic heads themselves or sensor elements fabricated along with the magnetic heads and typically positioned between the magnetic heads at regularly spaced intervals. In either event, connector device 216 provides electrical contact with the magnetic heads or sensor elements, preferably obtained by developing clamping pressure with the side of the row being polished. Electrical connectors 218 provide coupling through an amplifier and associated circuitry to electrical connectors 210, inputted to control circuitry 76.

Thus, signals transmitted to control circuitry 76 through conductors 210 provide an indication if an adjustment to the polishing pressure is required, and eventually provides end point indication for the polishing cycle. The input/output transfer characteristics of actuator 100 can be continuously updated, if desired, by monitoring signals on conductor 109, providing load cell data resulting from driving signals applied by control circuitry 76 through conductors 109 to the piezoelectric element 106. These transfer characteristics can then be interrogated by control circuitry 76 in order to set a new level of driving signals to be applied to the piezoelectric element in response to material removal data received via conductors 210.

As can be seen from the above, row tool systems according to principles of the present invention utilize piezoelectric actuators coupled to bendable arms which incorporate measuring devices arranged in either half bridge or full bridge formats. The force measurement devices provide open-loop or, more preferably, closed-loop force activation control which is virtually independent of the type of product being lapped, thus contributing to the operational flexibility of systems according to principles of the present invention. Further advantages are enjoyed in that the calibration of systems according to principles of the present invention require only simple precision weights to verify the force measurement (e.g., load cell) performance and to provide a ready reference level for convenient electronic control system calibration. As noted above, the present invention provides simple mechanical linkage, partially comprised of load cell or other forced measurement devices, to augment the high force, linear full stroke outward characteristics of the piezoelectric actuators. As a result, a practically effective stroke can be obtained at the point where force is applied by the member systems (i.e., actuator and lever arm combinations) to the row tools. Due to the ability of the piezoelectric actuators to maintain a linear displacement, regardless of the stroke required, the overall system can be simplified and produced on a more cost effective basis.

In one regard, row tool systems can be divided into two categories in which the actuator is located either on-board the row tool or is remotely located from the row tool, being coupled thereto through a forced transmitting arrangement, usually one involving elver arms. In systems where actuators are incorporated with the row tools, the row tools are typically too expensive to discard at the end of each cycle of operation. However, because of stresses retained in the row tool material after the cycle of operation, and because the products carried on the row tool are typically bonded to, but thereafter must be removed from the row tool, it is important that the row tool be designed for disposal after a single cycle of operation.

Actuators according to the present invention are located remote from the row tool and are coupled thereto through suitable linkage means. The possibility arises that mechanical hysterisis may be experienced at the point where bending force is applied to the row tool, and such problems are aggravated in open-loop control systems. These problems are, however, avoided by the present invention wherein load cells or other force measuring devices are incorporated in the linkage coupling the actuator to the row tool.

As explained above, with reference to FIGS. 2 and 5, for example, three actuators are employed to deform row tool 12. Portions of the actuators have been removed in FIG. 5 to expose the plungers 54, thus indicating their alignment with the cavities 20 formed in row tool 12. By energizing the three actuators so as to apply upward or downward forces to bend pins within the three apertures 20, the bottom edge 90 of row tool 12 can be deformed so as to impart varying pressures to the teeth 92 carried by the bottom edge 90 of the row tool.

Currently, a relatively large number of magnetic heads (e.g., 40) are contained in a single row, so as to facilitate a mass polishing operation. Wafer fabrication processes in which multiple layers are deposited on a substrate are employed to produce the magnetic heads of a row, and the stripes associated with each head. As is known in the art, alignment errors are experienced with each wafer layer deposited. The cumulative error builds as layers are added to the wafer one on top of the other, and random distributions of magnetic head elements can be observed along the length of the row. Further, the amount of distribution experienced in a commercial manufacturing environment is subject to variations as different methods, equipment and process controls are employed.

In the past, head manufacturers have typically employed row polishing systems of the type indicated in FIG. 14 where only a few bend pins are used to control the polishing operation of a row. While these arrangements provide substantial control, it is becoming apparent that further refinements in row tool manipulation is needed. With the use of piezoelectric actuators described above, a pattern or matrix of actuators can be provided with the close spacing needed for "individual" bending of the row tool, where a bend pin is provided for each magnetic head, or at most only a few magnetic heads contained in a row.

Figure 10:
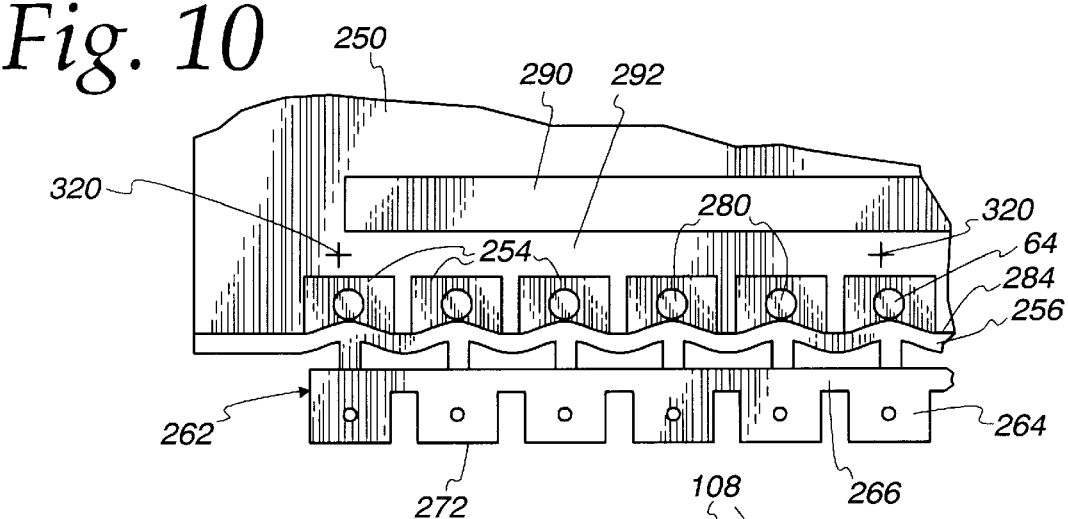
FIG. 10 is a cross-sectional view showing an alternative row tool actuator.

Turning now to FIGS. 9–13, arrangements are provided for individual bending systems in which a bend pin with its associated piezoelectric actuator is provided for each magnetic head of a row. As shown in FIGS. 9 and 10, a row tool 250 has a bottom edge 252 with a plurality of notches 254 extending to the free edge. A bend strip 256 carrying a plurality of teeth 258 is bonded to the free edge 252 of the row tool so as to enclose the notches 254. A row 262 of magnetic heads or other workpieces 264 is bonded to the teeth 258.

The magnetic heads 264, as shown in FIG. 9, are joined together by bridging portions 266 to form a continuous row structure. The bridging portions 266 are defined by slots 270 extending from the bottom free edge 272 of row 262. As indicated in FIG. 9, the slots have a dimension s slightly shorter than the height h of the row 262 (measured from the bottom free edge 272 to an upper free edge 274). According to one aspect of the present invention, the ratio of the slot dimension s to the row height h ranges between 0.80 and 0.95, and most preferably between 0.85 and 0.90. By relieving row 262 by an amount comprising a major portion of its height, the resulting bridging portions 266 provide an optimal flexibility for each magnetic head element 264, without causing a collateral deflection of adjoining elements when a force is applied to a particular element in row 262.

Figure 11:
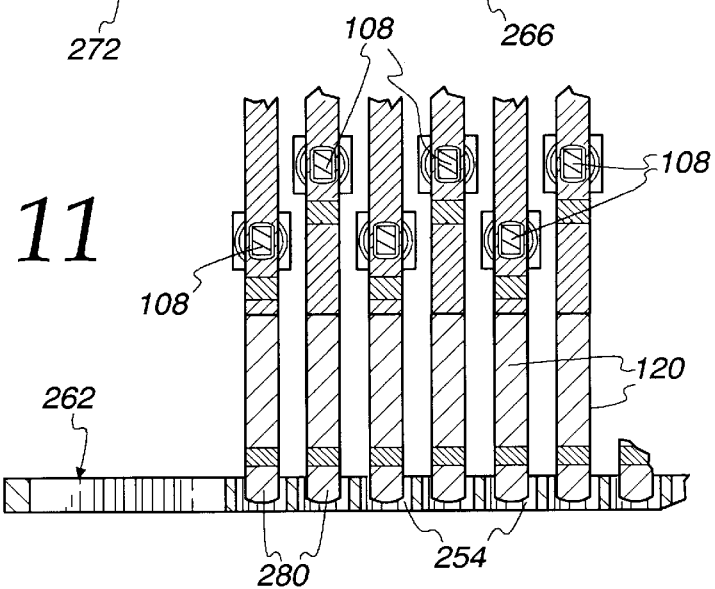
FIG. 11 shows a staggered linear array of row tool actuators employed with the row polishing assembly of FIG. 7.
Figure 12:
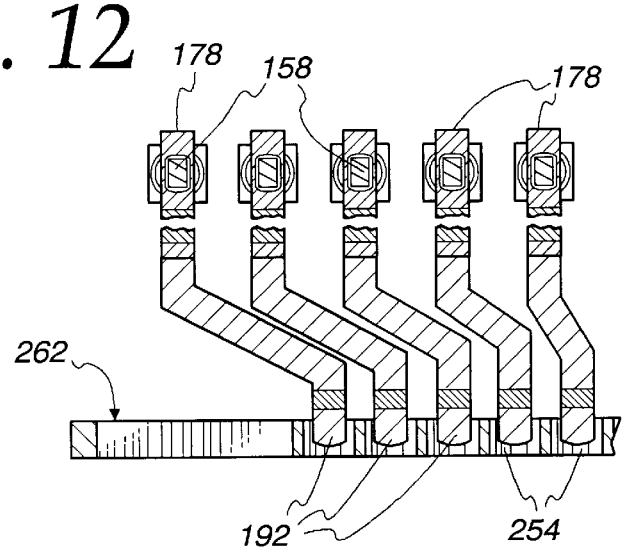
FIG. 12 shows a linear array of row tool actuators used in conjunction with the row tool assembly of FIG. 7.

A plurality of bend pins 280 are schematically indicated in FIG. 9 and, as mentioned, are aligned with respective magnetic head elements 264 of row 262. The bend pins 280 can be actuated in opposed upward and downward directions by virtually any actuator available today. However, the piezoelectric driven actuators described above provide an optimal close pitch spacing as indicated in FIGS. 11 and 12 so as to provide ready application for use in a row tool polishing assembly in which each magnetic head element of the row has its own respective actuator/bend pin arrangement. In FIG. 11, the actuators are arranged in a staggered row, as can be seen from the staggered placement of the plunger members 108. As can be seen from FIG. 11, every other lever arm 120 has been elongated or shortened in order to provide the staggered, closely packed spacing of actuators adjacent the row tool 262. If desired, piezoelectric driven actuators 30 or 150 could be substituted.

FIG. 12 shows a second arrangement for the array of actuators, in which the actuators are "fanned out" to have a larger pitch spacing than the pitch spacing of magnetic head elements on row 262. FIG. 12 indicates an arrangement of actuator members 150, showing their plungers 158 at the aforementioned increased pitch spacing. If desired, however, other actuators may be employed, including those commercially available today, as well as the aforementioned piezoelectric driven actuators 32 and 100.

Referring again to FIGS. 9 and 10, the bend plate 256 has a material composition chosen so as to be readily deformable when subjected to aligning forces imparted by the bend pins 280. While virtually any material may be employed for bend plate 256, a tin or tin/antimony alloy is preferred. It may be possible in some instances to provide the desired range of polishing pressures required for the various magnetic head elements along a row, by applying a downward force only to each tooth 258.

Thus, it may be possible to provide the desired range of control by applying only downward forces to each bend pin 280. However, it is recognized that in some instances the bend pins 280 may be required to apply a vertical upward force and this may be achieved in one of two ways. First, the bend pins 280 can be bonded to the upper surface 284 of bend plate 256 such that upward displacement of the bend pin will pull up the attached portion of bend plate 256 into the notch cavities 254. This will in turn result in a vertically upward lifting force applied to the tooth 258 and the magnetic head element 264 located beneath the bend pin. In this manner, the row tool 250 can be fabricated so as to be substantially unbendable with compliance being relied upon solely by the bend plate 256. Alternatively, the row tool 250 can be relieved by one or more apertures 290 formed above the notches 254 SO as to create an intervening compliant region 292 deflected by bend pins 280 which are made to move freely within notched portion 254, traveling between the upper surface 284 of bend plate 256 and the intermediate bendable region 292.

Referring to FIG. 10, the row tool assembly is shown after completion of a polishing operation. As will be noted by comparing FIGS. 9 and 10, bend plate 256 has taken a "set" responding to the deflection forces applied during the polishing operation. The undulating configuration of bend plate 256 stresses the desirability of providing a row tool of inexpensive manufacture, which can be disposed of subsequent to a polishing operation, if desired. Due to the increased range of performance provided by the piezoelectric actuators described herein and the closed loop control system made economical by the present invention, it may be possible to re-use the bend plate 256 if the distortions and stored stresses are not excessive. However, it may be necessary in some instances to replace the bend plate 256 with a fresh, undistorted bend plate of the type illustrated in FIG. 9.

As mentioned above, it may be possible in some circumstances to apply a bending force in a single, downward direction. It has been observed that the downward bending force applied by one bending pin will result in an upward deflection of the bend plate covering adjacent notch cavities 254. This resulting "up-welling" of adjacent bend plate portions may be relied upon in certain instances to provide the desired upward force. For example, a row tool may be lifted after initiation of a polishing process and a determination of those positions at which an upwardly directed force is required. With the row tool slightly backed away from the polishing surface, a downward force may be applied as required to provide the desired "up-welling" where further lifting force is anticipated throughout the remainder of the polishing operation. If it should be found that the lifting force is no longer required at some point during the operation, the bend pins may be individually actuated to provide a downward force necessary to cancel the lifting forces caused by up-welling of the bend plate.

Figure 13:
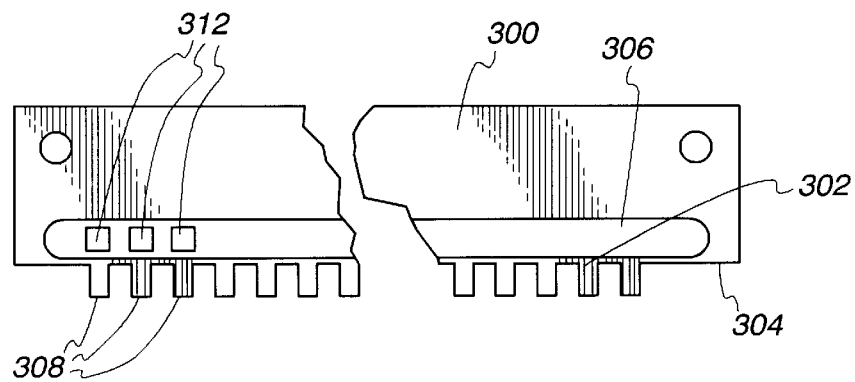
FIG. 13 is a front elevational view of an alternative row tool assembly.

Referring now to FIG. 13, an alternative row tool 300 is made of a unitary composition, being stamped or otherwise formed from a sheet metal blank. The row tool 300 has an intermediate portion 302 extending between a bottom edge 304 and a compliance producing aperture 305. A plurality of teeth 308 extend from the lower edge 304 of the row tool body. Preferably, the material composition of row tool 300 and the dimension of intermediate portion 302 are chosen such that the intermediate portion 302 is readily deflected under the force of bend pins 312. Preferably, only a downward force is required to be applied to the teeth 308, and the bend pins 312 need not be bonded to the intermediate region 302. However, if a lifting force is required for the teeth 308, the bend pins 312 can be bonded to the intermediate region 302 such that lifting of a bend pin will cause an upward distortion of the intermediate region and hence the tooth 308 associated with the bend pin. Further, it is possible to provide additional rigid relieving apertures closely spaced above aperture 306.

The above discussion of row tools illustrated in FIGS. 9–13 assumes that individual actuation of each magnetic head element location on the row tool is sufficient for desired polishing pressures throughout a polishing operation. It may be desirable in certain instances to provide individual bending actuators having a reduced range of force capability. For example, such reduced force range may be desirable in providing improved responsiveness for relatively small sized random excursions of the various magnetic head elements of a row, from a reference line. It is possible to incorporate conventional bend pin arrangements (e.g., 3 in number) with the individual bend pin arrangements (e.g., 40 in number) made possible by the present invention. In these instances, the conventional bend pin arrangement can be utilized to correct for gross bow deviations which have been observed with conventional row tools, while relying upon the individual bend actuators to provide a fine adjustment as may be required for individual magnetic head elements of a row. With reference to FIG. 10, apertures similar to apertures 20 shown above in FIG. 6, may be located at reference points 320 shown in FIG. 10 in order to provide conventional third order or fifth order correction of row tool curvature, as is now possible with three-bend-pin arrangements.

It will thus be observed that the piezoelectric driven actuator arrangements of the present invention provide a bi-directional bending force which can be rapidly changed in direction and magnitude. Further, since the piezoelectric elements are associated with an actuator mechanism and not with the row tool, the row tool can be economically manufactured so as to be disposable, if necessary. Further, economical manufacturing of row tools accommodating individual bending forces for each magnetic head element of the row is made possible with the bend plate constructions described above. It will also be appreciated that polishing arrangements according to principles of the present invention allow for the use of conventional low cost circuitry for individual closed loop control of each position on the row tool and individual actuation for each magnetic head element of the row can be readily accommodated in an economical, practical manner.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A row tool assembly, comprising:
    an elongated mounting bar having a bottom portion between opposed ends;
    a plurality of teeth spaced apart by bend openings formed in the bottom portion of the mounting bar;
    a plurality of spaced-apart workpieces joined side-by-side to form a linear row having opposed upper and lower row surfaces, with the upper row surface joined to the bottom edge of said bar member with individual workpieces aligned with individual ones of said plurality of teeth, a plurality of stress relief openings formed between said plurality of workpieces so as to free said workpieces for individual, substantially independent movement; and
    said bend openings aligned with said workpieces, said relief stress opening said stress relief openings aligned with said teeth and extending between 70 and 95% of the distance between the upper and the lower row surfaces.

2. The assembly of claim 1 wherein at least some bottom portions of the row tool above said teeth are substantially unbendable.

3. The assembly of claim 2 further comprising a bend plate of bendable material between the bottom edge of said bar member and the upper surface of said row.

4. The assembly of claim 1 wherein the row tool includes an intermediate, bendable portion above said teeth so that said teeth are movable in a direction toward said row in response to aligning forces applied to said intermediate portion.

5. The assembly of claim 4 wherein said intermediate, bendable portion defines at least one opening for application of aligning forces to said intermediate bendable portion.

6. The assembly of claim 4 wherein said intermediate bendable portion defines at least three openings for application of aligning forces to said intermediate, bendable portion.

7. A row tool for carrying a plurality of spaced-apart workpieces joined side-by-side to form a linear row and for applying aligning forces to the row during a surfacing operation, comprising:
    an elongated mounting bar having a bottom portion between opposed ends said bottom portion having a bottom edge;
    a plurality of teeth spaced apart by bend openings formed in the bottom portion of the mounting bar; and a bend plate of bendable material joined to the bottom edge of said mounting bar so as to enclose said bend openings.

8. The assembly of claim 7 wherein portions of the mounting bar above said teeth are substantially unbendable.

9. A row tool actuator for applying an aligning force to a row tool during a surfacing operation, comprising:

an actuator body;

a lever having a bendable central portion between a first end and a second opposed end for engaging a row tool, portions of the lever remote from the second end pivotally connected to the actuator body for supporting cantilever loadings applied to said lever;

a plunger mounted by said actuator body for movement toward and away from said lever; and a piezoelectric element and counteracting bias springs mounted by said actuator body to urge the plunger toward and away from said lever so as to apply an adjusting force to the central portion of said lever, thereby causing a desired force to be applied to said row tool by the second end of said lever.

10. The row tool actuator of claim 9 wherein the first end of said plunger engages the first end of said lever.

11. The row tool actuator of claim 10 further comprising a plurality of load cells carried by the central portion of said lever to sense the load being applied by the second end of said lever.

12. The row tool actuator of claim 9 wherein the first end of said lever is pivotally connected to the actuator body.

13. The row tool actuator of claim 12 further comprising a plurality of load cells carried by the central portion of said lever to sense the load being applied by the second end of said lever.

14. An arrangement for applying a plurality of aligning forces to a row tool during a surfacing operation, comprising a mounting structure and a plurality of row tool actuators supported by the mounting structure, the row tool actuators including:

an actuator body;

a lever having a bendable central portion between a first end and a second opposed end for engaging the row tool, portions of the lever remote from the second end pivotally connected to the actuator body for supporting cantilever loadings applied to said lever;

a plunger mounted by said actuator body for movement toward and away from said lever; and a piezoelectric element and counteracting bias springs mounted by said actuator body to urge the plunger toward and away from said lever so as to apply an adjusting force to the central portion of said lever, thereby causing a desired force to be applied to said row tool by the second end of said lever.

15. The arrangement of claim 14 wherein three row tool actuators are mounted to the mounting structure.

16. The arrangement of claim 14 wherein at least forty row tool actuators are mounted to the mounting structure.

17. The arrangement of claim 16 wherein the actuator bodies are disposed to one side of said row.

18. The arrangement of claim 17 wherein the row has a preselected length and the actuator bodies are disposed in a linear array of length substantially greater than said preselected length.

19. The arrangement of claim 17 wherein the row has a preselected length and the actuator bodies are disposed in a staggered linear array.

20. The arrangement of claim 19 wherein the first ends of said plungers engage the first end of said levers.

21. The arrangement of claim 20 further comprising a plurality of load cells carried by the central portions of said levers to sense the loads being applied by the second ends of said levers.

22. The arrangement of claim 19 wherein the first ends of said levers are pivotally connected to respective ones of the actuator bodies.

23. The arrangement of claim 22 further comprising a plurality of load cells carried by the central portions of said levers to sense the loads being applied by the second ends of said levers.

24. A method of preparing an array of magnetic heads joined side-by-side to form a linear row having a bottom free edge, comprising the steps of:

providing a mounting bar having a bottom edge carrying a plurality of spaced-apart teeth;

mounting the array of heads to said mounting bar, with individual ones of said magnetic heads located adjacent respective ones of said plurality of teeth;

providing a rough polish wheel;

pressing said mounting bar toward said rough polish wheel so as to press said magnetic heads in polishing engagement with said rough polish wheel;

forming slots between said magnetic heads in said row of magnetic heads extending more than half of the distance from the bottom free edge of said row of magnetic heads and the bottom edge of the mounting bar;

providing a fine polish wheel; and pressing said mounting bar toward said fine polish wheel so as to bring said plurality of mounting heads into polish engagement with said fine polish wheel.

25. The method of claim 24 wherein said step of forming slots in said row of magnetic heads comprises forming slots in said row of magnetic heads extending between 70 and 95% of the distance from the bottom free edge of said row of magnetic heads to the bottom edge of the mounting bar.

26. The method of claim 24 wherein said step of forming slots in said row of magnetic heads comprises forming slots in said row of magnetic heads extending between 85% and 90% of the distance from the bottom free edge of said row of magnetic heads to the bottom edge of the mounting bar.

27. The method of claim 24 wherein mounting bar defines alignment apertures adjacent each of the heads in said row, and said step of pressing said mounting bar toward said fine polish wheel comprises the steps of:

providing a number of bend arms corresponding to the number of magnetic heads in said row;

passing the bend arms through said alignment apertures; and applying alignment forces with said bend arms to respective ones of said magnetic heads.

28. The method of claim 24 wherein said step of providing the mounting bar comprises the steps of:

providing a mounting bar having a bottom free edge carrying a plurality of spaced-apart teeth with intra-teeth slots of preselected width between said teeth, said intra-teeth slots opening to the bottom free edge of said mounting bar;

providing a bend strip of bendable material;

attaching the bend strip to said teeth so as to enclose said intra-teeth slots to thereby form alignment apertures.

29. The method of claim 28 wherein said step of pressing said mounting bar toward said fine polish wheel comprises the steps of:

providing a number of bend arms corresponding to the number of magnetic heads in said row;

passing the bend arms through said alignment apertures; and applying alignment forces with said bend arms to respective ones of said magnetic heads.

* * * * *

UNITED STATES PATENT AND TRADEMARK OFFICE
CERTIFICATE OF CORRECTION

PATENT NO. : 6,045,431
DATED : April 4, 2000
INVENTOR(S) : Cheprasov et al.

Page 1 of 1

It is certified that error appears in the above-identified patent and that said Letters Patent is hereby corrected as shown below:

The correct name and address of the Assignee is:
SPEEDFAM-IPEC CORPORATION:
Chandler, Arizona 85226

Signed and Sealed this

Twenty-first Day of August, 2001

Attest:

*Nicholas P. Godici*

*Attesting Officer*

NICHOLAS P. GODICI
*Acting Director of the United States Patent and Trademark Office*